United States Patent
Tsuchibuchi et al.

(10) Patent No.: US 10,419,638 B2
(45) Date of Patent: Sep. 17, 2019

(54) IMAGE PROCESSING APPARATUS AND IMAGE PROCESSING METHOD

(71) Applicant: FUJI XEROX CO., LTD., Tokyo (JP)

(72) Inventors: Kiyotaka Tsuchibuchi, Kanagawa (JP); Hiroshi Hayashi, Kanagawa (JP); Masashi Okano, Kanagawa (JP); Junichi Shimizu, Kanagawa (JP); Hiroshi Niina, Kanagawa (JP); Tetsuya Wakiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/785,850

(22) Filed: Oct. 17, 2017

(65) Prior Publication Data

US 2018/0278799 A1 Sep. 27, 2018

(30) Foreign Application Priority Data

Mar. 21, 2017 (JP) .................... 2017-054448

(51) Int. Cl.
*H04N 1/387* (2006.01)
*H04N 1/21* (2006.01)

(52) U.S. Cl.
CPC ......... *H04N 1/3878* (2013.01); *H04N 1/2104* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2003/0016391 | A1* | 1/2003 | Tamura | G06K 15/02 358/1.16 |
| 2007/0067579 | A1* | 3/2007 | Kashiwaya | G11C 5/025 711/147 |
| 2016/0077459 | A1* | 3/2016 | Miyadera | G03G 15/043 347/118 |
| 2017/0075583 | A1* | 3/2017 | Alexander | G06F 3/0605 |

FOREIGN PATENT DOCUMENTS

| | | |
|---|---|---|
| JP | 2015-198425 A | 11/2015 |
| JP | 2015-201677 A | 11/2015 |

* cited by examiner

*Primary Examiner* — Frantz Bataille
(74) *Attorney, Agent, or Firm* — Oliff PLC (57) ABSTRACT

An image processing apparatus includes a first memory, a transfer unit, a second memory, and a processor. The first memory retains image data. The transfer unit reads from the first memory and transfers the image data for each area having a predetermined size. The second memory retains the image data of each area transferred by the transfer unit and allows random reading on a per address basis. The processor reads the image data from the second memory and performs a process for rotating an image for the read image data.

12 Claims, 9 Drawing Sheets

IMAGE PROCESSING APPARATUS AND IMAGE PROCESSING METHOD

CROSS-REFERENCE TO RELATED APPLICATIONS

This application is based on and claims priority under 35 USC 119 from Japanese Patent Application No. 2017-054448 filed Mar. 21, 2017.

BACKGROUND (i) Technical Field

The present invention relates to an image processing apparatus and an image processing method.

(ii) Related Art

As a technique for high-speed data transfer, burst transfer is available. In burst transfer, data stored at consecutive memory addresses for the burst length is consecutively read from the memory. With burst transfer, data is transferred faster than in a case of using a usual technique in which an address is specified each time data is read.

An image read (scanned) by an image reading device is stored in a memory for each line of the image extending in a main scanning direction of the image reading device in a consecutive manner. At this time, high-speed image (data) reading using burst transfer is performed.

SUMMARY

According to an aspect of the invention, there is provided an image processing apparatus including a first memory, a transfer unit, a second memory, and a processor. The first memory retains image data. The transfer unit reads from the first memory and transfers the image data for each area having a predetermined size. The second memory retains the image data of each area transferred by the transfer unit and allows random reading on a per address basis. The processor reads the image data from the second memory and performs a process for rotating an image for the read image data.

BRIEF DESCRIPTION OF THE DRAWINGS

An exemplary embodiment of the present invention will be described in detail based on the following figures, wherein:

FIGS. 3A to 3C are diagrams illustrating blocks of a target image, where

FIGS. 4A and 4B are diagrams illustrating a method for reading an image by a read control unit in a case where a target image is tilted relative to the direction in which image reading is performed in a burst transfer, where

FIGS. 5A and 5B are diagrams illustrating a position relationship between two tiles related to two blocks adjacent to each other, where

FIGS. 8A and 8B are diagrams illustrating a state where a tile is enlarged, where

DETAILED DESCRIPTION

Hereinafter, an exemplary embodiment of the present invention will be described in detail with reference to the attached drawings.

Configuration of Image Processing Apparatus According to Exemplary Embodiment

Figure 1:
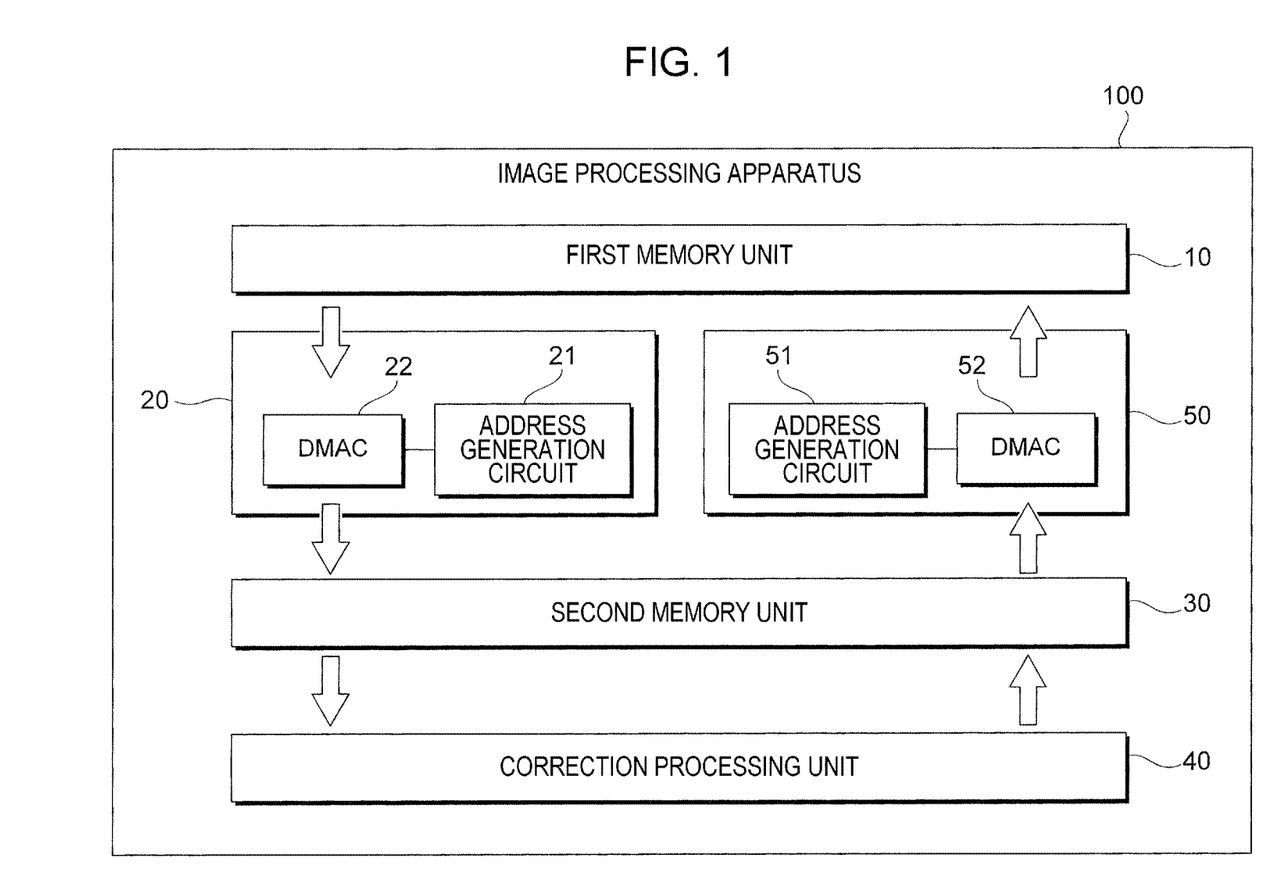
FIG. 1 is a diagram illustrating a functional configuration of an image processing apparatus according to an exemplary embodiment.

FIG. 1 is a diagram illustrating a functional configuration of an image processing apparatus 100 according to an exemplary embodiment. As illustrated in FIG. 1, the image processing apparatus 100 according to this exemplary embodiment includes a first memory unit 10, a read control unit 20, a second memory unit 30, a correction processing unit 40, and a write control unit 50.

The first memory unit 10 is a first memory that retains an image to be processed (hereinafter referred to as a target image) and a target image that has been processed by the correction processing unit 40. As the first memory unit 10, a storage device having a storage capacity sufficient to retain the entire target image is used. For example, a dynamic random access memory (DRAM) is used.

The read control unit 20 is a transfer unit that reads data of an image from the first memory unit 10 and transfers the data to the second memory unit 30. The read control unit 20 is constituted by, for example, an address generation circuit 21 that generates an address in the first memory unit 10 at which data to be read is stored and a direct memory access controller (DMAC) 22, as illustrated in FIG. 1. The read control unit 20 according to this exemplary embodiment reads an image on the basis of an area having a predetermined size and transfers the image. The read control unit 20 transfers the image in a burst transfer. The details of reading of an image by the read control unit 20 will be described below.

The second memory unit 30 is a second memory that retains an image read by the read control unit 20 as a target of a correction process by the correction processing unit 40. As the second memory unit 30, a storage device that is randomly accessible on a per address basis is used. For example, a static random access memory (SRAM) is used.

The correction processing unit 40 is a processor that performs image processing including a process (a tilt correction process) for rotating an image retained in the second memory unit 30. The function of the correction processing unit 40 is implemented by, for example, a central processing unit (CPU) executing a program. The details of a correction made by the correction processing unit 40 will be described below.

The write control unit 50 is an output unit that writes an image corrected by the correction processing unit 40 to the first memory unit 10. The write control unit 50 is constituted by, for example, an address generation circuit 51 that generates a write destination address in the first memory unit 10 and a DMAC 52, as illustrated in FIG. 1.

The above configuration has been described under the assumption that a target image is stored in the first memory unit 10; however, a configuration may be employed in which an input unit for inputting an image to be stored in the first memory unit 10 is provided, and an image input through the input unit is stored in the first memory unit 10. As the input unit for inputting an image, a reading device (scanner) that optically reads an image may be provided, or a configuration may be employed in which a network interface is provided, and an image is received from an external device (not illustrated) via a network. An example case is described below in which a multifunction peripheral having a copy function, an image reading function, a printing function, a facsimile communication function, and so on is used as the image processing apparatus 100.

Example Application of Image Processing Apparatus

Figure 2:
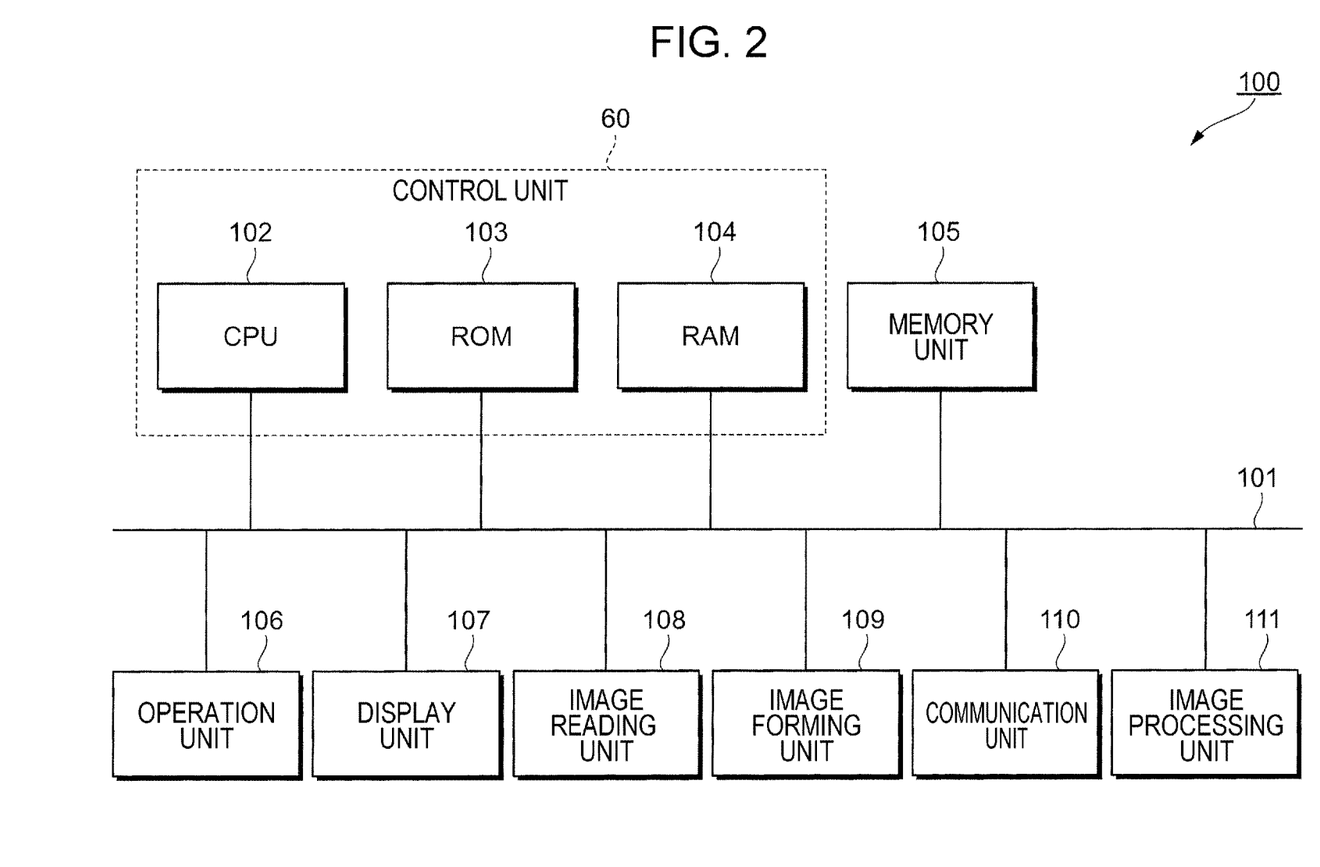
FIG. 2 is a diagram illustrating a functional configuration of a multifunction peripheral that is an example of the image processing apparatus.

FIG. 2 is a diagram illustrating a functional configuration of a multifunction peripheral that is an example of the image processing apparatus 100. In the configuration illustrated in FIG. 2, the image processing apparatus 100 includes a CPU 102, a read-only memory (ROM) 103, and a random access memory (RAM) 104, which constitute a control unit 60. The image processing apparatus 100 further includes a memory unit 105, an operation unit 106, a display unit 107, an image reading unit 108, an image forming unit 109, a communication unit 110, and an image processing unit 111. These functional units are connected to a bus 101 and exchange data via the bus 101.

The operation unit 106 accepts an operation by a user. The operation unit 106 is constituted by, for example, hardware keys or a touch sensor that outputs a control signal in accordance with a position at which pressing force is applied. The operation unit 106 may be constituted by a touch panel formed by combining a touch sensor and a liquid crystal display that constitutes the display unit 107 described below.

The display unit 107 is an example of a display and is constituted by, for example, a liquid crystal display. The display unit 107 displays information regarding the image processing apparatus 100 in accordance with control by the CPU 102. Further, the display unit 107 displays a menu screen that is viewed by a user when the user operates the image processing apparatus 100. That is, the operation unit 106 described above and the display unit 107 are combined to function as a user interface unit of the image processing apparatus 100.

The image reading unit 108 is constituted by a scanner device. The image reading unit 108 optically reads an image on a document that is set, and generates a read image (image data). As the method for reading an image, a charge-coupled device (CCD) method or a contact image sensor (CIS) method is used. In the CCD method, light is emitted to a document from a light source, and reflected light is condensed by a lens and received by a CCD. In the CIS method, light beams are sequentially emitted to a document from a light emitting diode (LED) light source, and reflected light beams are received by a CIS.

The image forming unit 109 is an example of an image forming unit. The image forming unit 109 forms an image based on image data on a sheet that is an example of a recording material by using an image forming material. As the method for forming an image on a recording material, for example, an electrophotographic method in which a toner adhered to a photoconductor is transferred to a recording material to form an image or an ink-jet method in which an ink is ejected to a recording material to form an image is used.

The communication unit 110 has a network interface for connection to an external device via a network. In a case where the image processing apparatus 100 has a facsimile function, the communication unit 110 also has a function of connecting to a telephone line for facsimile transmission and reception, which is, however, not explicitly described.

The image processing unit 111 includes a processor, which is an arithmetic unit, and a work memory and performs image processing, such as a color correction or a tone correction, for an image represented by image data. Although not specifically illustrated, as the work memory, the image processing unit 111 includes a memory (for example, a DRAM) that retains a target image and a buffer memory (for example, an SRAM) that is used when processing is performed. The image processing unit 111 includes an address generation circuit and a DMAC for directly passing data between these memories (direct memory access (DMA)). In a case where the CPU 102 and the processor of the image processing unit 111 are constituted by a system-on-chip (SoC), the RAM 104 may also be used as the work memory. Further, the CPU 102 may also be used as the processor of the image processing unit 111, and the RAM 104 may also be used as the work memory.

The memory unit 105 is an example of a memory and is constituted by a storage device, such as a hard disk drive. The memory unit 105 stores image data of, for example, a read image generated by the image reading unit 108.

Among the CPU 102, the ROM 103, and the RAM 104 that constitute the control unit 60, the ROM 103 stores a program that is executed by the CPU 102. The CPU 102 reads the program stored in the ROM 103, uses the RAM 104 as a work area, and executes the program. A program stored in the memory unit 105 may be loaded to the RAM 104, and the program loaded to the RAM 104 may be executed by the CPU 102.

The program that is executed by the CPU 102 may be stored in a computer-readable recording medium, such as a magnetic recording medium (for example, a magnetic disc), an optical recording medium (for example, an optical disc), or a semiconductor memory, and provided to the image processing apparatus 100. The program that is executed by the CPU 102 may be provided to the image processing apparatus 100 via a network, such as the Internet.

In the multifunction peripheral illustrated in FIG. 2, the image processing unit 111 implements the functions of the image processing apparatus 100. That is, the work memory of the image processing unit 111 is implemented as the first memory unit 10 and the second memory unit 30, and the processor of the image processing unit 111 is implemented as the correction processing unit 40. In the case where the CPU 102 and the RAM 104 of the control unit 60 are also used as the processor and the work memory of the image processing unit 111 respectively, as described above, the RAM 104 may be used as the first memory unit 10 illustrated in FIG. 1, a cache memory (not illustrated) of the CPU 102 may be used as the second memory unit 30 illustrated in FIG. 1, and the CPU 102 may be used as the correction processing unit 40 illustrated in FIG. 1. In the multifunction peripheral illustrated in FIG. 2, the image reading unit 108 may be used as an input unit for inputting a target image.

Unit for Processing Image

Now, a unit for processing a target image is described. In this exemplary embodiment, a target image retained in the first memory unit 10 is read, a correction process for the target image is performed by the correction processing unit 40, and the target image is written to the first memory unit 10 for each block (rectangular area) having a predetermined size obtained by dividing the target image. That is, one block is a unit for reading a target image from the first memory unit 10, a unit for a correction process, and a unit for writing a target image to the first memory unit 10.

Figure 3A:
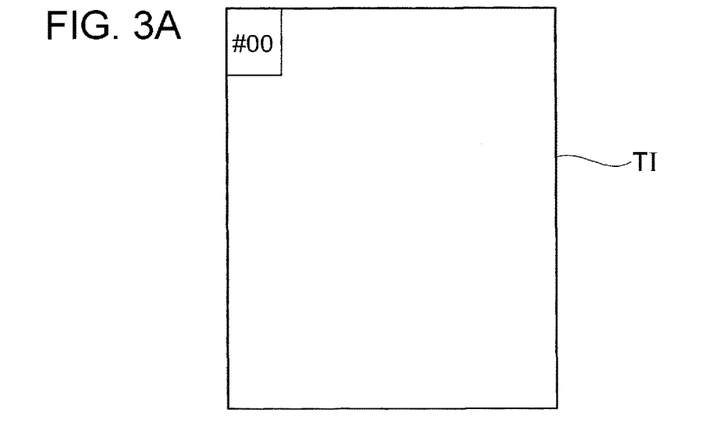
FIG. 3A is a diagram illustrating a first block that is set in a target image.
Figure 3B:
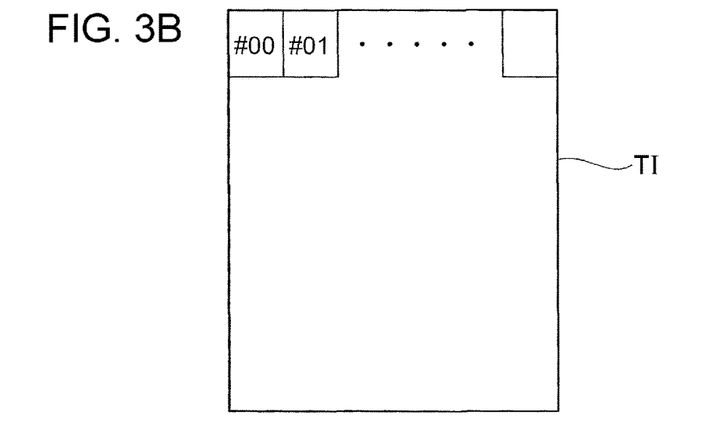
FIG. 3B is a diagram illustrating blocks for one row constituted by second and subsequent blocks.
Figure 3C:
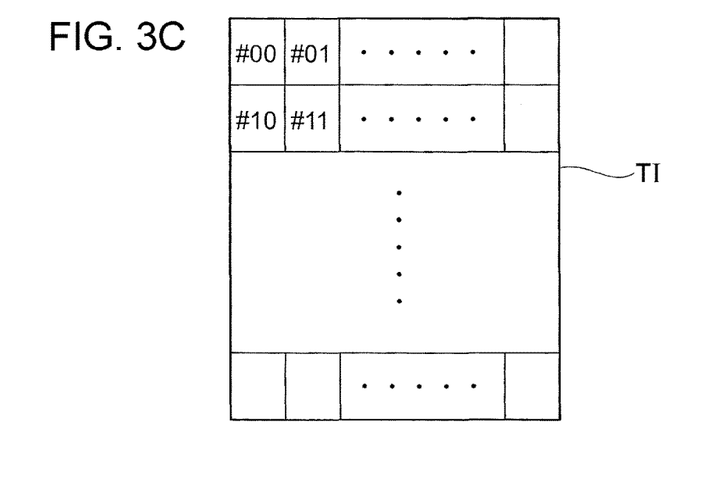
FIG. 3C is a diagram illustrating blocks that are set throughout the target image.

FIGS. 3A to 3C are diagrams illustrating blocks (processing unit areas) of a target image. FIG. 3A is a diagram illustrating a first block that is set in a target image. FIG. 3B is a diagram illustrating blocks for one row constituted by second and subsequent blocks. FIG. 3C is a diagram illustrating blocks that are set throughout the target image. In the examples illustrated in FIGS. 3A to 3C, the first block #00 is set at the top left of the target image TI (see FIG. 3A). The second and subsequent blocks (#01 and so on) that constitute a block row are sequentially arranged rightward from the right of the block #00 to the top right of the target image TI (see FIG. 3B). In the row below this first block row, the blocks (#10 and so on) in the second block row are arranged and set rightward from just below the block #00, and similar block rows are sequentially arranged downward down to the bottom of the target image TI in a similar manner (see FIG. 3C). The direction in which blocks in one block row are arranged is assumed to be a main scanning direction, and the direction in which block rows are arranged is assumed to be a sub-scanning direction. This exemplary embodiment assumes that reading of, a correction process for, and writing of the target image TI are each performed in accordance with the above-described sequence. That is, reading, a correction process, and writing are each performed sequentially from the top left block through the bottom right block, namely, from the leftmost block to the rightmost block in each block row, and from the top block row to the bottom block row. Note that the setting of blocks and the sequence in each process in the description given above are only examples and not restrictive.

In this exemplary embodiment, the size of one block is determined on the basis of the burst length in a burst transfer and the storage capacity of the second memory unit 30. In a case where the length of the side of the target image TI that extends in the direction in which each block row extends is not equal to an integral multiple of the length of the side of each block that extends in the same direction, the size of a partial image included in the leftmost block in each block row in the same direction is smaller than the length of the side of each block that extends in the same direction. In a case where the length of the side of the target image TI that extends in a direction crossing block rows is not equal to an integral multiple of the length of the side of each block that extends in the same direction, the size of a partial image included in each block in the bottom block row in the same direction is smaller than the length of the side of each block that extends in the same direction. Note that, in the case where the length of a side of the target image TI extending in a direction is not equal to an integral multiple of the length of a side of each block extending in the same direction, as described above, the leftmost block in each block row or each block in the bottom block row may be adjusted to a block having a smaller size so as to fit with the size of the target image TI.

Image Reading Process

Now, an image reading process performed by the read control unit 20 is described. In this exemplary embodiment, the read control unit 20 reads a target image retained in the first memory unit 10 for each block described above in accordance with the sequence described above. At this time, if the target image TI is not tilted relative to the direction in which image reading is performed in a burst transfer, the target image TI needs to be read for each area corresponding to a block. On the other hand, if the target image TI is tilted relative to the direction in which image reading is performed in a burst transfer, in order to read the image for each block by taking into account the tilt, the image needs to be read for each area (hereinafter, this area is called a tile) that includes a block and larger than the block. The tile, which is a transfer unit area, is a rectangular area circumscribed about a block and having sides that are not tilted relative to the direction in which image reading is performed in a burst transfer.

Determination as to whether the target image TI is tilted may be performed by using any existing method. For example, in a case where the target image TI is obtained by the image reading unit 108 of the image processing apparatus 100 illustrated in FIG. 2 reading an image formed on a sheet, a sensor for recognizing the state in which a sheet is placed on the image reading unit 108 may be provided, the tilt of the sheet may be detected upon reading, and the detected tilt may be regarded as the tilt of the target image TI. Alternatively, an image formed on a sheet may be analyzed to detect the tilt of the target image TI.

Figure 4A:
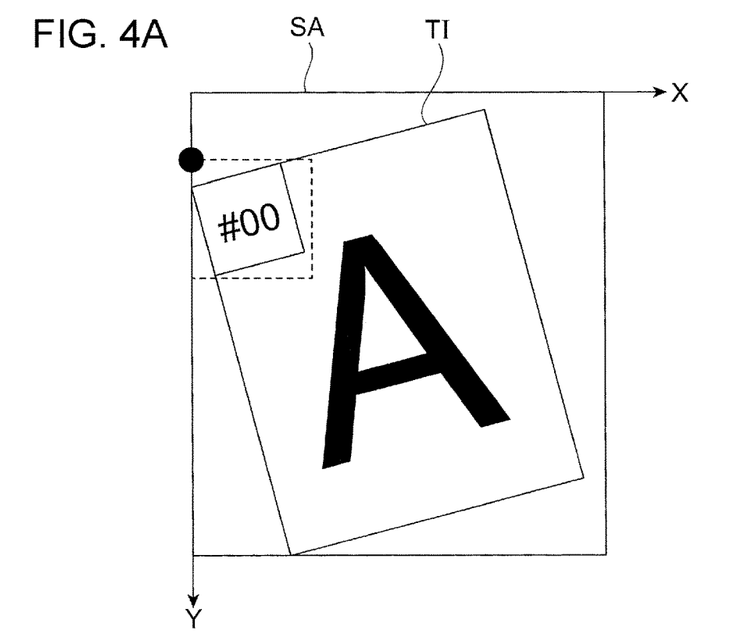
FIG. 4A is a diagram illustrating a state where the first block illustrated in FIG. 3A is read.
Figure 4B:
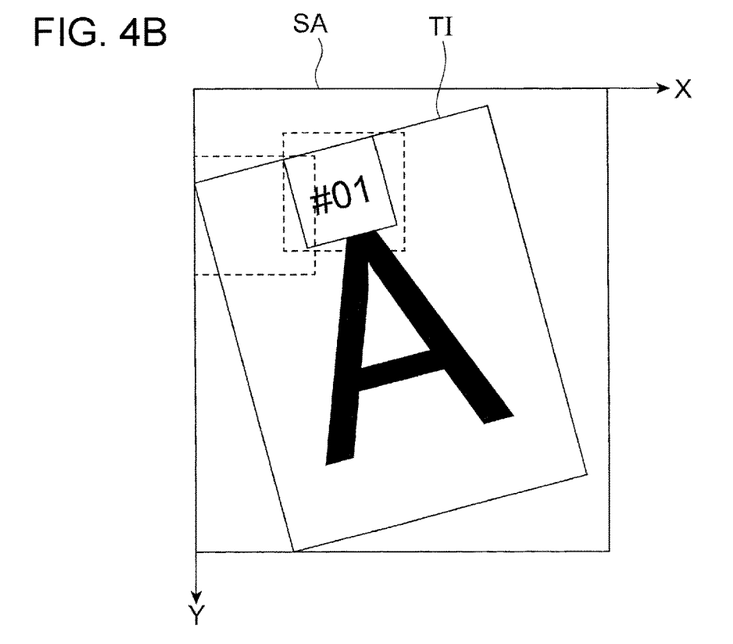
FIG. 4B is a diagram illustrating a state where the second block illustrated in FIG. 3B is read.

FIGS. 4A and 4B are diagrams illustrating a method for reading an image by the read control unit 20 in the case where the target image TI is tilted relative to the direction in which image reading is performed in a burst transfer. FIG. 4A is a diagram illustrating a state where the block #00 illustrated in FIG. 3A is read, and FIG. 4B is a diagram illustrating a state where the block #01 illustrated in FIG. 3B is read. In the examples illustrated in FIGS. 4A and 4B, the area SA represents a storage area for an image in the first memory unit 10. For the area SA, an orthogonal coordinate system (the X-Y coordinate system in the examples illustrated in FIGS. 4A and 4B) is set, and one axis of the orthogonal coordinate system matches the direction in which image reading is performed in a burst transfer. In the examples illustrated in FIGS. 4A and 4B, the target image TI stored in the area SA is tilted (rotated) leftward at an angle $\theta$. The position of each block of the target image TI based on the coordinate system of the area SA is calculated by performing a calculation using an affine transformation.

As illustrated in FIG. 4A, when the block #00 of the tilted target image TI is read, an image of the area of a tile that includes the block #00 is read. Similarly, as illustrated in FIG. 4B, when the block #01 is read, an image of the area of a tile that includes the block #01 is read. Hereinafter, the tile that includes the block #00 is called a tile #00, and the tile that includes the block #01 is called a tile #01. Referring to FIG. 4B, the tile #00 that includes the block #00 and the tile #01 that includes the block #01 partially overlap because of the tilt of the target image TI relative to the area SA.

Figure 5A:
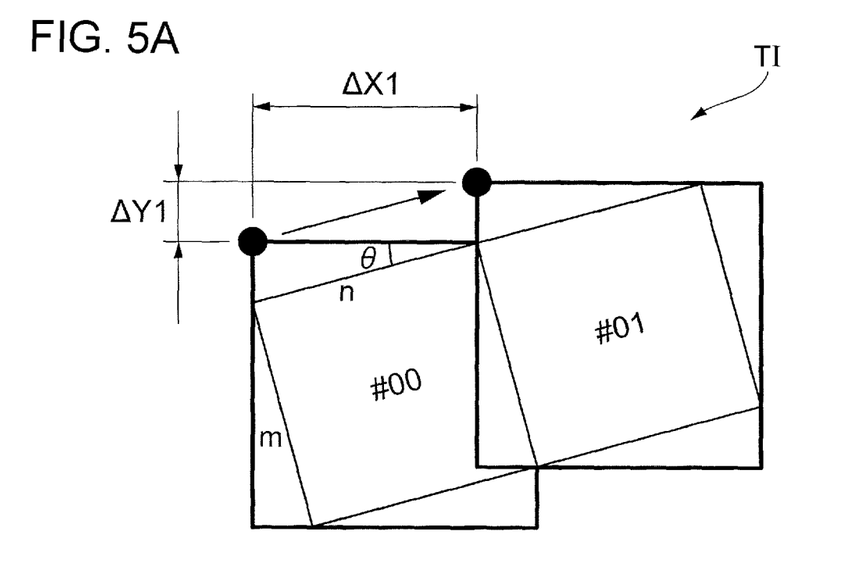
FIG. 5A is a diagram illustrating a position relationship between two tiles related to blocks adjacent to each other in a main scanning direction.
Figure 5B:
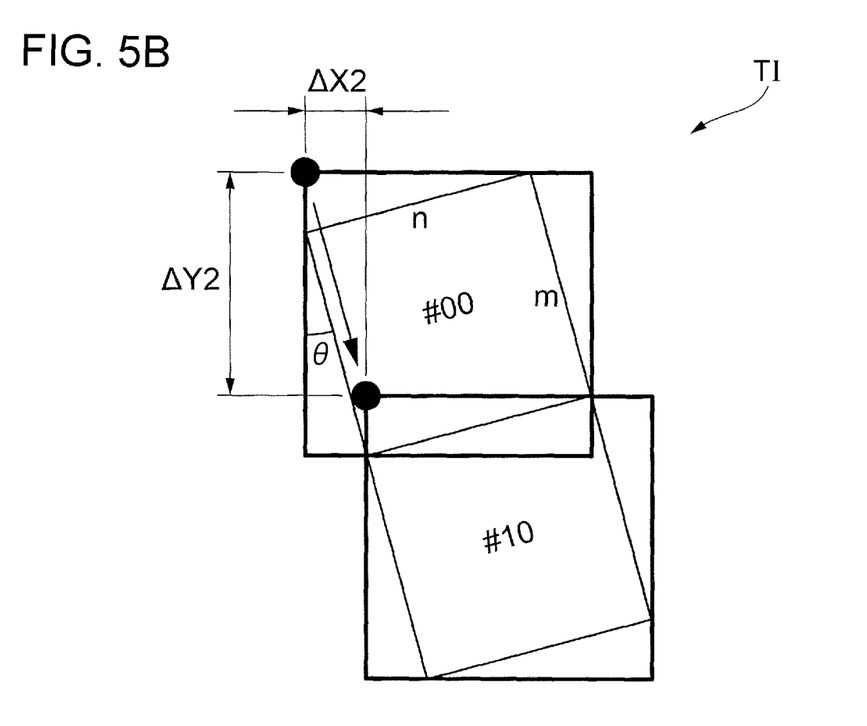
FIG. 5B is a diagram illustrating a position relationship between two tiles related to blocks adjacent to each other in a sub-scanning direction.

FIGS. 5A and 5B are diagrams illustrating a position relationship between two tiles related to two blocks adjacent to each other. FIG. 5A is a diagram illustrating a position relationship between two tiles (the tile #00 and the tile #01) related to blocks (the block #00 and the block #01) adjacent to each other in the main scanning direction. FIG. 5B is a diagram illustrating a position relationship between two tiles (the tile #00 and the tile #10) related to blocks (the block #00 and the block #10) adjacent to each other in the sub-scanning direction. In the examples illustrated in FIGS. 5A and 5B, the top left corner of each tile (the position indicated by a black dot) is assumed to be a reference position used to identify a position relationship between tiles.

Referring to FIG. 5A, the interval between the reference positions of the two tiles related to the blocks adjacent to each other in the main scanning direction is $\Delta X1$ along the coordinate axis X and $\Delta Y1$ along the coordinate axis Y in the orthogonal coordinate (X-Y coordinate) system set in the area SA. Here, the target image TI is rotated relative to the area SA at an angle θ. Therefore, when the size of each block in the main scanning direction is represented by n, $\Delta X1$ and $\Delta Y1$ are expressed by $\Delta X1 = n \times \cos\theta$ and $\Delta Y1 = n \times \sin\theta$, respectively. Similarly, referring to FIG. 5B, the interval between the reference positions of the two tiles related to the blocks adjacent to each other in the sub-scanning direction is $\Delta X2$ along the coordinate axis X and $\Delta Y2$ along the coordinate axis Y. When the size of each block in the sub-scanning direction is represented by m, $\Delta X2$ and $\Delta Y2$ are expressed by $\Delta X2 = m \times \sin\theta$ and $\Delta Y2 = m \times \cos\theta$, respectively. Accordingly, the tile #00 and the tile #01 partially overlap, and the tile #00 and the tile #10 partially overlap, as illustrated in FIGS. 5A and 5B.

Therefore, in a case of reading the target image TI for each block, the read control unit 20 performs a scan in the main scanning direction while shifting the target tile by {$\Delta X1$, $\Delta Y1$}. Each time a scan of blocks in one row is completed, the read control unit 20 shifts the target tile by {$\Delta X2$, $\Delta Y2$} and performs a scan in the sub-scanning direction.

Now, the size of a tile and the pixel values of the target image TI in a block included in a tile are described. In the case where the target image TI is tilted relative to the direction in which image reading is performed in a burst transfer (relative to a coordinate axis of the area SA), the position of each pixel of the target image TI based on the coordinate system of the area SA is calculated by performing a calculation using an affine transformation. Here, it is assumed that the position of each pixel in the case where the target image TI is not tilted corresponds to a position indicated by coordinates having integer values in the coordinate system of the area SA. Then, the coordinate values of each pixel calculated by performing an affine transformation are usually values having decimal fractions.

Figure 6:
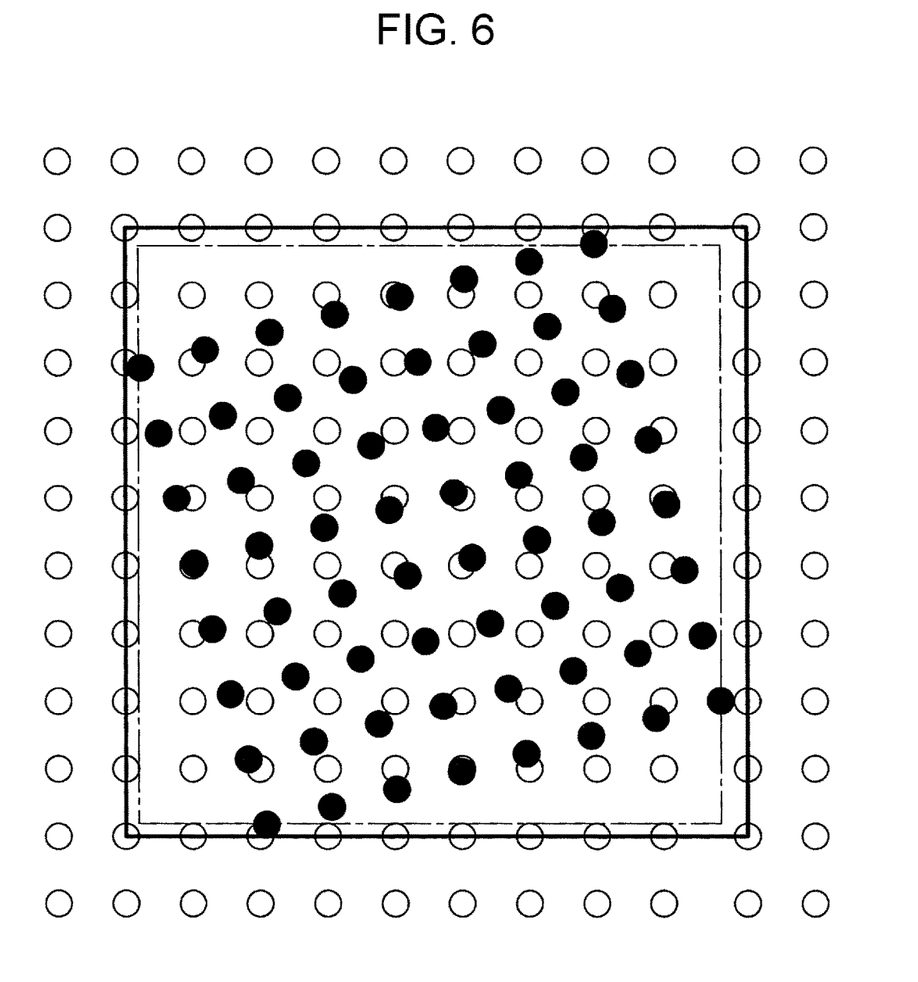
FIG. 6 is a diagram illustrating the positions of pixels of a tilted target image.

FIG. 6 is a diagram illustrating the positions of pixels of the tilted target image TI in the coordinate system of the area SA. In FIG. 6, a white dot indicates the position of an actual pixel in an image stored in the area SA. The position of each white dot corresponds to a position indicated by coordinates having integer values in the coordinate system of the area SA. The position of each white dot matches the position of a corresponding pixel in the case where the target image TI is not tilted. In FIG. 6, a black dot indicates the position of a pixel (virtual pixel) in the state where the target image TI is tilted, the pixel being included in a block in the state where the target image TI is not tilted. In other words, in FIG. 6, one block of the target image TI is indicated by a set of black dots. After a tilt correction has been made, the position of a virtual pixel indicated by a black dot in FIG. 6 matches the position of a pixel indicated by a white dot in FIG. 6 and becomes a pixel that constitutes a block after the correction. The coordinate values of a black dot in the coordinate system of the area SA are values having decimal fractions, and therefore, the position of a black dot shifts from the position of a white dot (the position indicated by integer coordinate values) as illustrated in FIG. 6. Note that the positions of black dots vary depending on the angle of the tilt of the target image TI, and the positions indicated in FIG. 6 are only examples.

As illustrated in FIG. 6, in the case where the target image TI is tilted, the position of a black dot (a virtual pixel in a block) does not match the position of a white dot (the position indicated by coordinates having integer values in the coordinate system of the area SA). Accordingly, the pixel value of each pixel indicated by a black dot is calculated by, for example, performing an interpolation calculation using the pixel values of actual pixels in the image (the tilted target image TI) stored in the area SA.

Figure 7:
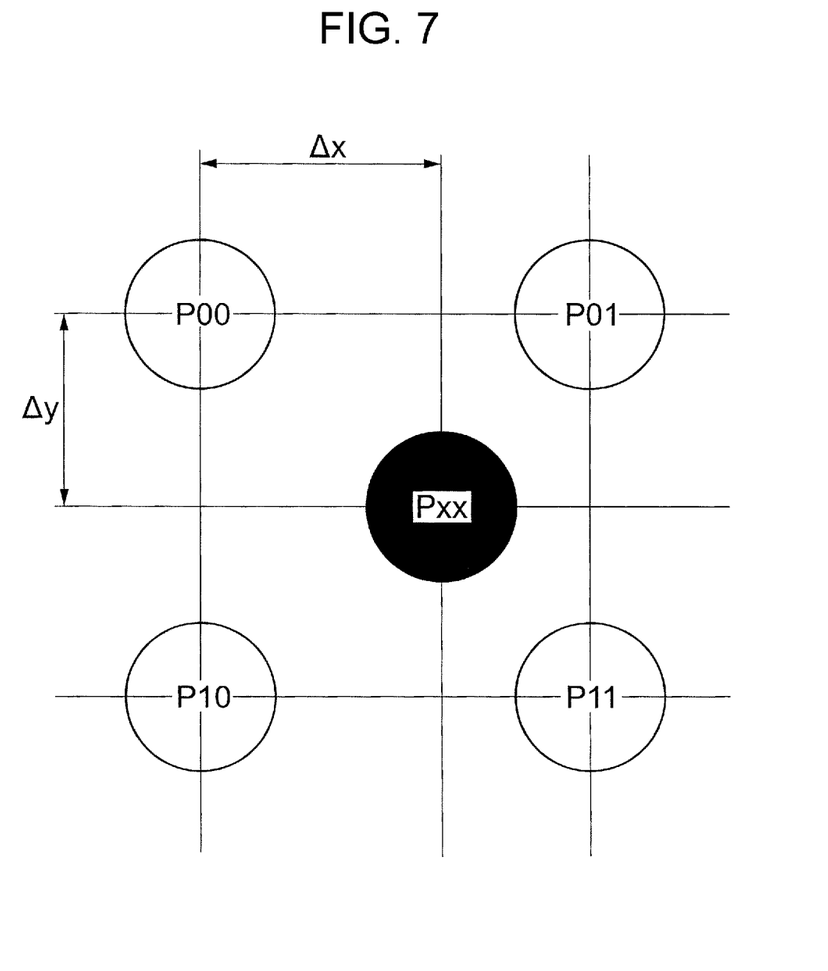
FIG. 7 is a diagram for describing an interpolation process for a pixel value.

FIG. 7 is a diagram for describing an interpolation process for a pixel value. The pixel value of a pixel Pxx indicated by a black dot in FIG. 7 is obtained by performing an interpolation calculation using the pixels values of four pixels P00, P01, P10, and P11 that surround the pixel Pxx and using the distances between the pixel Pxx and the surrounding four pixels as weighting coefficients. Specifically, when the coordinate axes of the area SA are used, and the position of the pixel P00 is assumed to be a reference position, the position of the pixel Pxx is defined as a position apart from the position of the pixel P00 by $\Delta x$ in the X direction and $\Delta y$ in the Y direction. Further, the length of one side of a square obtained by connecting the pixels P00, P01, P10, and P11 is assumed to be equal to 1. Further, the pixel value of a pixel is expressed by the reference numeral of the pixel. Then, the pixel value "Pxx" of the pixel Pxx is expressed by the following expression.

$$Pxx = (P00 \times (1-\Delta x) + P01 \times \Delta x) \times (1-\Delta y) + (P10 \times (1-\Delta x) + P11 \times \Delta x) \times \Delta y$$

Note that the method for the interpolation process is not limited to the above-described method, and any existing method may be used.

It has been described above that a tile, which is a unit for reading an image, is circumscribed about a block of the target image TI. In FIG. 6, a rectangle that is circumscribed about a set of black-dot pixels that represents a block is indicated by a dot-and-dash line. In order to obtain the pixel value of a black-dot pixel, the pixel values of white-dot pixels that surround the black-dot pixel are necessary, as described above. Therefore, an area (the rectangle indicated by a solid line) that includes white-dot pixels that are externally adjacent to black-dot pixels located outermost in the block (that is, in the four corners of the rectangular block) is a tile that is a unit for reading an image. In the example illustrated in FIG. 6, as a tile that includes a block that is a set of black-dot pixels constituted by 8 pixels×8 pixels, a tile having a size of 10 pixels×10 pixels is set.

The size of a tile is determined, as described above. In a case where data is actually transferred, the size of a tile is further adjusted (enlarged) as needed. In this exemplary embodiment, a transfer from the first memory unit 10 to the second memory unit 30 performed by the read control unit 20 (see FIG. 1) is a DMA transfer. In a DMA transfer, depending on the specifications of the DMAC 22 that performs the transfer, the alignment of the transfer start address may be restricted or the transfer start address might not match a specific alignment position, resulting in a decrease in transfer efficiency. Accordingly, in this exemplary embodiment, the start position of a transfer of an image (tile) is adjusted in accordance with the specifications of the DMA transfer to thereby suppress a decrease in transfer efficiency. In this exemplary embodiment, an image is transferred in a bust transfer. Therefore, the size of a tile is adjusted so that the amount of data to be transferred becomes an amount corresponding to the burst length to thereby increase transfer efficiency.

Figure 8A:
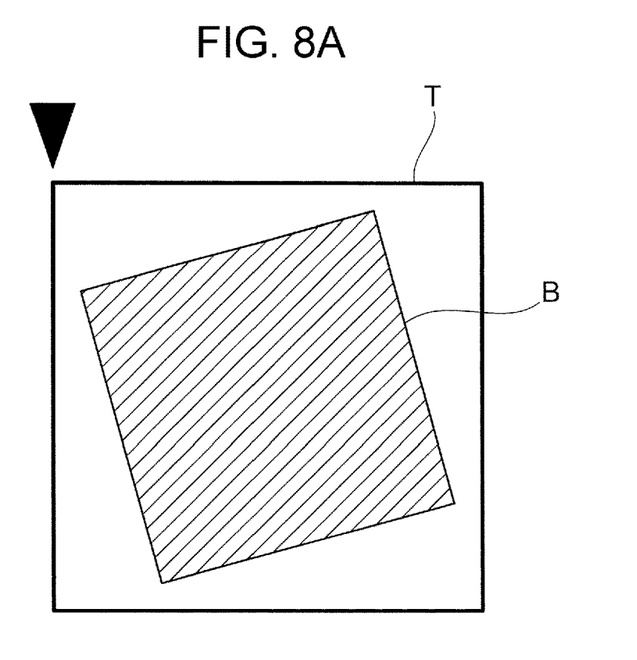
FIG. 8A is a diagram illustrating a tile that is set as illustrated in FIG. 6.
Figure 8B:
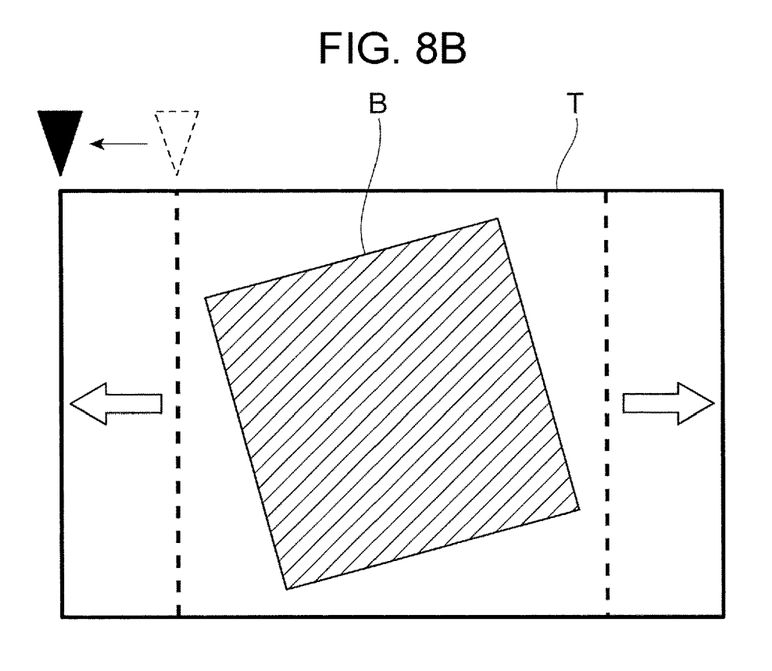
FIG. 8B is a diagram illustrating the tile illustrated in FIG. 8A, which is enlarged.

FIGS. 8A and 8B are diagrams illustrating a state where a tile is enlarged. FIG. 8A is a diagram illustrating a tile that is set as illustrated in FIG. 6, and FIG. 8B is a diagram illustrating the tile illustrated in FIG. 8A, which is enlarged. In FIG. 8A, the tile T includes the block B. As described with reference to FIG. 6, the tile T includes all pixels necessary for calculating the pixel values of virtual pixels that constitute the block B. In FIGS. 8A and 8B, the arrow (triangle) placed at the top left of the tile T indicates the transfer start position. That is, when the read control unit 20 reads the tile T, the read control unit 20 sequentially reads and transfers lines of the tile T one by one from the line of pixels from the top left pixel at the head through the top right pixel to the line of pixels from the bottom left pixel at the head through the bottom right pixel.

In a case where transfer efficiency decreases when a DMA transfer starts at the transfer start position illustrated in FIG. 8A, the tile is enlarged to change the transfer start position, as illustrated in FIG. 8B. For example, it is assumed that the DMAC 22 limits the address of the transfer start position to a multiple of a numerical value "16". In this case, the lower four bits of the address of the head position of each line of the tile (the position of the left side of the tile indicated by the arrow in FIG. 8A) are masked to zero. As a result, the value of the address becomes a multiple of a numerical value "16", and the head position of each line of the tile moves as illustrated in FIG. 8B.

Each pixel line of the tile T is read on a per burst-length basis. Therefore, in a case where the length (the number of pixels) of a line of the tile T for which the transfer start position is moved is not equal to an integral multiple of the burst length, the length of the line is adjusted so as to become an integral multiple of the burst length. That is, the end position of the line is moved, as illustrated in FIG. 8B. Accordingly, the size of the tile T enlarges in the direction in which the read control unit 20 reads pixel lines. The read control unit 20 reads from the first memory unit 10 and transfers to the second memory unit 30 an image for each tile T thus enlarged.

In a case where the tile T is enlarged as described above, the transfer start position is moved on the basis of the address of the head position of the line in the original tile T illustrated in FIG. 8A. Therefore, the amount of movement of the transfer start position is determined for each tile T. The end position of the line is determined so that the length from the head position after movement to the end position becomes an integral multiple of the burst length. Therefore, the amount of movement of the end position is also determined for each tile T.

Tilt Correction Process

Now, a tilt correction process performed by the correction processing unit 40 is described. The correction processing unit 40 reads an image of one block transferred to the second memory unit 30 and makes a tilt correction. Specifically, the correction processing unit 40 calculates, for each pixel that constitutes a block (for each virtual pixel indicated by a black dot in FIG. 6 and FIG. 7), the pixel value and the address after a tilt correction in a memory space of the second memory unit 30, and writes the pixel after the correction to the second memory unit 30 on the basis of the result of calculation. The pixel value of each pixel is obtained by performing an interpolation calculation using the pixel values of surrounding pixels (actual pixels indicated by white dots in FIG. 6 and FIG. 7) necessary for interpolation of the pixel value of the pixel. The address after a tilt correction is obtained by, for example, performing an inverse transformation of an affine transformation used to obtain the position of the block when the read control unit 20 reads the block (tile) from the first memory unit 10. The second memory unit 30 is randomly accessible on a per address basis, and therefore, it is possible to perform the above-described process for each pixel that constitutes the block.

When the calculation of the pixel value and the address conversion are completed for each pixel in one block as described above, an image of the block for which the tilt has been corrected is stored in the second memory unit 30. Thereafter, the write control unit 50 reads the image of the block, which is retained in the second memory unit 30 and for which the tilt has been corrected, and transfers the image to the first memory unit 10. At this time, data is transferred by performing a DMA transfer and a burst transfer. Therefore, as in the case of reading an image by the read control unit 20, the start position of a write address upon writing to the first memory unit 10 and the length of one pixel line that is transferred may be adjusted.

When the above-described process is performed for all blocks that constitute the target image TI, the tilt correction of the target image TI is completed. As described above, in this exemplary embodiment, a block having a size that is set on the basis of the storage capacity of the second memory unit 30 is assumed to be a base unit, and a burst transfer of the target image TI from the first memory unit 10 to the second memory unit 30 is performed for each tile that includes a block. Then, a tilt correction process is performed for each block of the image stored in the second memory unit 30, which is randomly accessible on a per address basis. Therefore, in this exemplary embodiment, a burst transfer is performed in only a data transfer on a per tile basis. Accordingly, a read data overlap that occurs when a tilt image is transferred in a burst transfer for a tilt correction process is limited to a portion in which tiles overlap and is smaller than that in a case where the entire image to be processed is transferred in a burst transfer.

Figure 9:
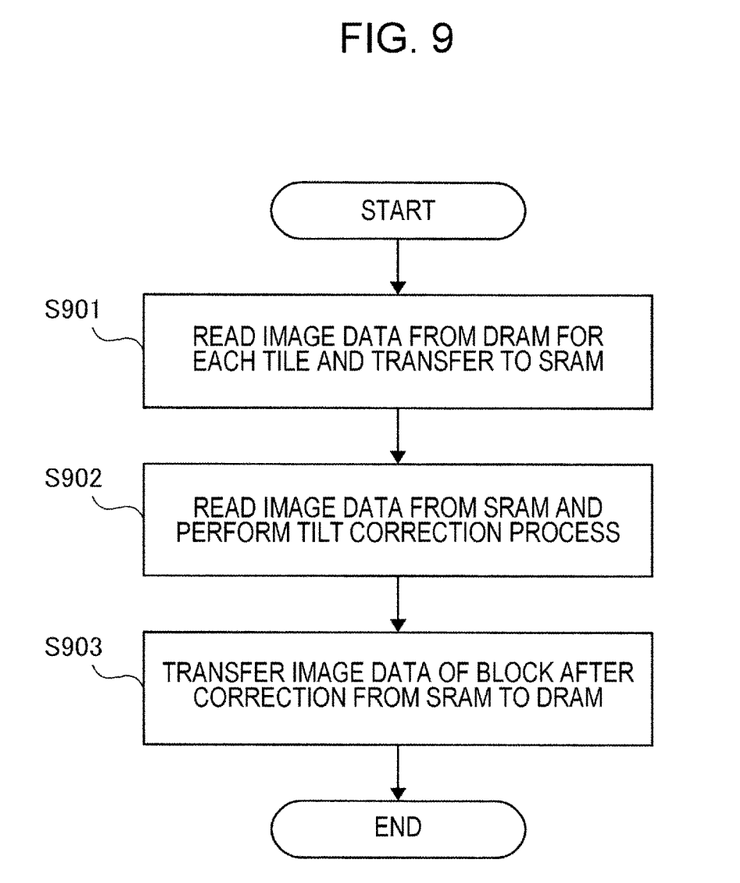
FIG. 9 is a flowchart illustrating an image processing method for the image processing apparatus according to an exemplary embodiment.

FIG. 9 is a flowchart illustrating an image processing method for the image processing apparatus 100 according to this exemplary embodiment. Here, a description is given below under the assumption that a DRAM is used as the first memory unit 10 and that an SRAM is used as the second memory unit 30. In this exemplary embodiment, the image processing apparatus 100 performs a tilt correction process for a target image stored in the DRAM, which is the first memory unit 10. The read control unit 20 of the image processing apparatus 100 reads image data from the DRAM, which is the first memory unit 10, for each tile that includes a predetermined block and transfers the image data to the SRAM, which is the second memory unit 30 (step S901). Here, the image data is transferred by performing a burst transfer and a DMA transfer. Therefore, the size of each tile is set such that the tile is circumscribed about the block. However, in an actual transfer, the transfer start position is adjusted and the tile is enlarged in accordance with the burst length to increase transfer efficiency achieved by the DMA transfer. The above-described process by the read control unit 20 is performed by a processor, which is the DMAC 22, executing a program.

Subsequently, the correction processing unit 40 of the image processing apparatus 100 reads the image data from the SRAM, which is the second memory unit 30, and performs a tilt correction process (a process for rotating the image) for the read image (step S902). Here, the SRAM is randomly accessible on a per address basis, and therefore, the correction processing unit 40 reads the image data for each pixel, performs a tilt correction process, namely, an interpolation process and an address conversion process, and writes the resulting data to the second memory unit 30. The above-described process by the correction processing unit 40 is performed by the CPU executing a program.

Subsequently, the write control unit 50 of the image processing apparatus 100 reads image data of each block after the correction from the SRAM, which is the second memory unit 30, and writes the image data to a storage area set in the DRAM, which is the first memory unit 10, the storage area being an area for storing the target image after the correction (step S903). This transfer is performed by performing a burst transfer and a DMA transfer as in the transfer in step S901 performed by the read control unit 20.

Modification

In this exemplary embodiment, the relationship between the storage capacity of the second memory unit 30 and the data size of each block may be set so as to enable a data transfer for two tiles to thereby perform data transfers in parallel. In this case, a data transfer for one block is performed while an interpolation process for each pixel in another block is being performed (so-called "ping-pong" buffering) to thereby increase the efficiency of the performed process and the processing speed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a first memory that retains image data;
a transfer unit that reads from the first memory and transfers the image data in processing unit areas of a predetermined size when the image data is not tilted, and transfers the image data in processing unit area greater than the predetermined size when the image data is tilted, wherein each of the processing unit areas greater than the predetermined size encompasses one of the processing unit areas having the predetermined size, the predetermined size and a size of the processing unit areas greater than the predetermined size are each smaller than a size of the image data, and the predetermined size is based on a burst length of a burst transfer of the transfer unit;
a second memory that retains the image data of each area transferred by the transfer unit and allows random reading on a per address basis; and
a processor that reads the image data from the second memory and performs a process for rotating an image for the read image data.

2. The image processing apparatus according to claim 1, wherein
the transfer unit reads from the first memory and transfers to the second memory the image data for each transfer unit area that includes a processing unit area that is set on the basis of a storage capacity of the second memory, and the processor performs image processing for an image represented by the image data of each processing unit area retained in the second memory.

3. The image processing apparatus according to claim 2, wherein
the transfer unit increases a size of the transfer unit area in accordance with a burst length in a burst transfer, and reads from the first memory and transfers to the second memory the image data by performing a burst transfer.

4. The image processing apparatus according to claim 2, wherein
the transfer unit adjusts a transfer start position of the transfer unit area on the basis of alignment of a transfer start position of data in a direct memory access transfer, and reads from the first memory and transfers to the second memory the image data by performing a direct memory access transfer.

5. The image processing apparatus according to claim 3, wherein
the transfer unit adjusts a transfer start position of the transfer unit area on the basis of alignment of a transfer start position of data in a direct memory access transfer, and reads from the first memory and transfers to the second memory the image data by performing a direct memory access transfer.

6. The image processing apparatus according to claim 1, wherein
the second memory is a static random access memory.

7. The image processing apparatus according to claim 2, wherein
the second memory is a static random access memory.

8. The image processing apparatus according to claim 3, wherein
the second memory is a static random access memory.

9. The image processing apparatus according to claim 4, wherein
the second memory is a static random access memory.

10. The image processing apparatus according to claim 5, wherein
the second memory is a static random access memory.

11. An image processing apparatus comprising:
a dynamic random access memory that retains image data;
a transfer unit that transfers the image data from the dynamic random access memory for each processing unit area having a predetermined size by performing a burst transfer when the image data is not tilted, and transfers the image data from the dynamic random access memory for processing unit areas greater than the predetermined size when the image data is tilted, wherein each processing unit area greater than the predetermined size encompasses one of the processing unit areas having the predetermined size, the predetermined size and a size of the processing unit areas greater than the predetermined size are each smaller than a size of the image data, and the predetermined size is based on a burst length of a burst transfer of the transfer unit;
a static random access memory that retains the image data of each area transferred by the transfer unit; and
a processor that reads the image data from the static random access memory and performs a process for rotating an image for the read image data.

12. An image processing method comprising:
reading, from a dynamic random access memory retaining image data, and transferring, to a static random access memory, the image data for each processing unit area having a predetermined size when the image data is not tilted, and transferring, to the static random access memory, the image data from for processing unit areas greater than the predetermined size when the image data is tilted, wherein each processing unit area greater than the predetermined size encompasses one of the processing unit areas having the predetermined size, the predetermined size and a size of the processing unit areas greater than the predetermined size are each smaller than a size of the image data, and the predetermined size is based on a burst length of a burst transfer of the transfer unit; and reading the image data from the static random access memory and performing a process for rotating an image for the read image data.

\* \* \* \* \*